A. TROUARD.
Sugar-Cane Cultivators.
No. 135,174. Patented Jan. 21, 1873.
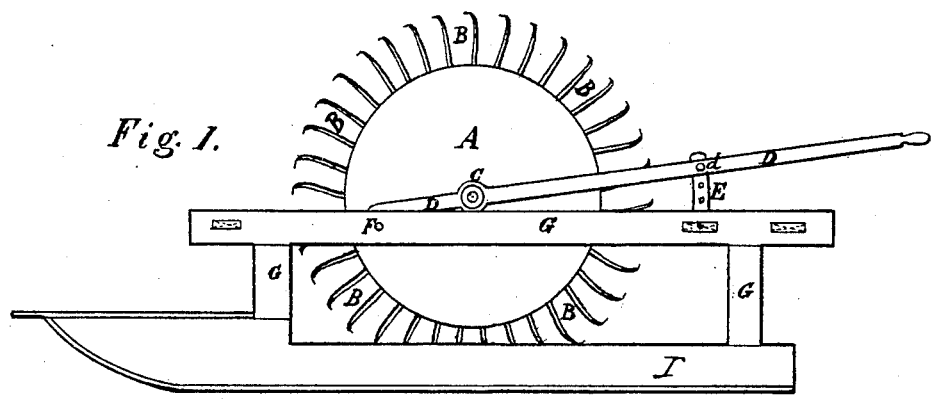
Fig. 1.
Fig. 3.
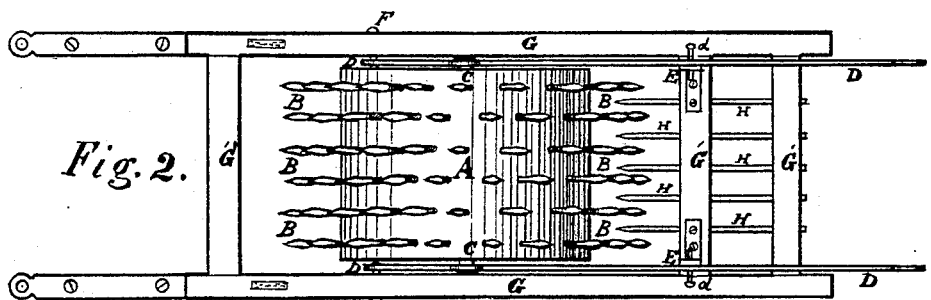
Fig. 2.
Fig. 4.
Witnesses.  Inventor.

UNITED STATES PATENT OFFICE.

ALCIDE TROUARD, OF NEW ORLEANS, LOUISIANA.

IMPROVEMENT IN SUGAR-CANE CULTIVATORS.

Specification forming part of Letters Patent No. 135,174, dated January 21, 1873.

*To all whom it may concern:*

Be it known that I, ALCIDE TROUARD, of New Orleans, in the parish of Orleans and State of Louisiana, have invented an Improved Machine for Grubbing Sugar-Cane Stubble, of which the following is a specification:

As is well-known to those acquainted with the cultivation of the sugar-cane, particularly the method practiced in Louisiana, after the first year's growth the cane is grown from the stubble or short portion of the stalk left standing in the ground. In the spring the tops of the stubble are generally shaved by a suitable implement or machine, and then "grubbed"—that is, the hard earth is removed from between the stalks in order to allow the heat and light to penetrate. Subsequently, when the new cane has shot up, fresh earth is thrown in and the plant thoroughly cultivated. The operation of grubbing is always one of the most laborious and expensive in the cultivation of the sugar-cane, having been performed entirely with the hoe until the production of my machine, which I will now proceed to describe.

In the accompanying drawing, Figure 1 is an elevation, and Fig. 2 a plan view of the machine. Fig. 3 represents the stubble before and Fig. 4 after being grubbed.

A indicates a wood or metal cylinder, provided or set with teeth B, having sharp and curved arrow-shaped points. The cylinder revolves around an axle, C, which is mounted or journaled in levers D D, that are pivoted at their forward ends F F to the frame-bars G G, and are adjustable vertically at their rear ends by means of the standards E and pegs *d*. The bars G, with the cross-bars G', constitute the frame proper of the machine, which is supported on runners I I, made in the form of ordinary sled-runners. H H are horizontal bars or rods for cleaning the teeth of the cylinder. Before the machine can be used the stubble is barred off, as shown in Fig. 4, by running a plow on each side of the row. A shaver on slides is then run in the furrows to shave or slice off the stubble to an even length. My machine is then run in the same furrows, and the hook-teeth of the cylinder enter between the stubble-stalks and grub or pick out the earth. The cylinder is adjusted vertically to correspond to the condition of the soil or stubble. Thus this hitherto expensive and laborious operation may be quickly, efficiently, and cheaply performed by my improved machine.

I am aware of the previous employment of toothed adjustable rotary cylinders for pulverizing or otherwise acting upon the earth to fit it for reception of seed; also, that certain agricultural machines have been provided with runners.

What I consider new, and claim as my invention, is—

The improved machine for grubbing sugar-cane stubble, the same consisting of frame G G', runners I I, and the cylinder A, provided with the teeth B, having points constructed as described, said cylinder being mounted on the axle-shaft C journaled in the pivoted levers D, which are adjusted at their free ends by the standards E and pins *d*, all as shown and described.

A. TROUARD.

Witnesses:
   ED. DROUET,
   A. PERSAC.